United States Patent [19]

Lee

[11] 4,424,804
[45] Jan. 10, 1984

[54] PASSIVE SOLAR HEATING AND COOLING MEANS

[76] Inventor: Kenneth S. Lee, 2046 Mershon, Ann Arbor, Mich. 48104

[21] Appl. No.: 164,602

[22] Filed: Jun. 30, 1980

[51] Int. Cl.³ ................................................ F24J 3/02
[52] U.S. Cl. .................................... 126/430; 126/431; 126/429; 52/307
[58] Field of Search ............... 126/430, 431, 428, 429, 126/417, 437; 52/307, 576, 577, 602, 220, 382; 98/31

[56] References Cited

U.S. PATENT DOCUMENTS

| | | | |
|---|---|---|---|
| 1,761,848 | 6/1930 | Sitzman | 52/576 X |
| 2,534,580 | 12/1950 | Edwards | 52/307 X |
| 2,811,850 | 11/1957 | Clary | 98/31 X |
| 3,243,117 | 3/1966 | Morgan | 126/428 |
| 3,249,682 | 5/1966 | Laing | 126/444 X |
| 3,330,079 | 7/1967 | Mitchell et al. | 52/307 X |
| 3,457,848 | 7/1969 | Pankow | 98/31 |
| 4,069,809 | 1/1978 | Strand | 126/431 X |
| 4,147,300 | 4/1979 | Milburn | 126/429 |
| 4,151,954 | 5/1979 | Jacobs | 126/429 X |
| 4,217,884 | 8/1980 | Strong | 126/430 |
| 4,223,664 | 9/1980 | Fattor | 126/430 X |
| 4,257,477 | 3/1981 | Maloney | 126/431 X |
| 4,274,396 | 6/1981 | Peters et al. | 126/438 |
| 4,324,226 | 4/1982 | Beck | 126/430 X |

OTHER PUBLICATIONS

Solar Collector Storage Panel, Proceedings of the 2nd National Passive Solar Conference, vol. II (Mar. 16–18, 1978), Illinois Institute of Technology, pp. 481–484.
Appendix, U.S. Patents on Inventions by W. A. Shurcliff, Brick House Publications, 1979.

Primary Examiner—Larry Jones
Attorney, Agent, or Firm—James M. Deimen

[57] ABSTRACT

The invention comprises means of controlling the insolation and radiation of passive solar thermal storage columns for heating and cooling of homes and other structures.

In one embodiment rotatable insulating panels control the exposure of round thermal storage columns to daytime sunlight and the nighttime sky. A second embodiment allows independent rotation of the column and the insulation panel for further control of the insolation and radiation.

In a third embodiment the rotatable insulating panels are positioned in concave depressions formed in vertical thermal storage columns. These columns include individual thermal convection means formed therein and are particularly suited to precast concrete or masonry construction.

In a fourth embodiment the rotatable panels are adapted to retrofit existing masonry walls for passive solar thermal storage.

The constructions disclosed can be utilized for vertical walls, sloping walls and roofs and flat roofs. Structural support must be modified depending on the orientation, however, the basic modes of operation are suitable for all orientations.

18 Claims, 26 Drawing Figures

PASSIVE SOLAR HEATING AND COOLING MEANS

BACKGROUND OF THE INVENTION

The field of the invention pertains to passive solar heating and cooling devices. In particular, the invention pertains to thermal storage devices that form the wall, roof or window of a structure for the absorbtion and radiation of heat to or from the structure.

Masses of stone, water and other materials have been used for many years as solar thermal storage mediums. In the northern hemisphere the materials are incorporated in a generally south facting wall or roof of a home or other structure. To increase the effectiveness of such mediums, glazing may be positioned outside of the thermal storage medium with an air gap of several inches therebetween. During the day the thermal medium warms and during the night the medium radiates the stored heat into the structure.

SUch a simple system unfortunately radiates heat back through the glass to the night sky. The heat radiated to the structure interior is also not controllable. To overcome these problems, movable insulated blankets have been employed to cover the thermal medium and prevent radiation to the night sky.

Vents below and above a thermal storage wall have been employed to provide natural air circulation from the structure interior, through the air gap and back into the structure. The latter has become commonly known as a Trombe wall after the originator of the technique.

More recently a research project has tested rotatable thermal storage panels containing a phase changeable medium with insulation directly fastened on one side and a reflective surface on the opposite side. The panels are located behind double glazing. Such movable panels permit the amount of heat stored and the amount of heat radiated to the structure to be controlled by the positioning of the panel both during the daytime and the nighttime. The tests were published in the Proceedings of the 2nd National Passive Solar Conference Vol. II (Mar. 16-18, 1978) Illinois Institute of Technology.

A form of window shutters that are rotatable with light and heat reflecting surfaces on one side and light and heat absorbing surfaces on the other side are disclosed in U.S. Pat. No. 3,012,294. The shutters are inside transparent tubes to permit the passage of light to the interior in an intermediate position of the shutters.

The challenge is to develop more effective means to both maximize the insolation of passive thermal storage walls and effectively control the heat radiated and convected to the structure interior in winter. More effective means are also needed to passively cool the structure interior by natural convection and radiation in the summer.

SUMMARY OF THE INVENTION

Disclosed are means for economically and effectively controlling the insolation and heat radiation of columnar solar thermal storage units for passive solar heating and cooling. It will be understood that heat radiation from thermal storage units for passive solar heating includes both direct radiation of heat energy to the structure interior and heat transferred by the convection of air adjacent the thermal storage units to the structure interior. For passive cooling the heat radiation is to the cool night sky and the heat absorbtion is from the structure interior mostly by convection during the day.

In the first embodiment disclosed, vertical water filled thermal storage columns are located between exterior glazing and optional interior drywall. Each column is equipped with a rotatable insulating panel and synchronizing mechanism to control the daytime insolation and nighttime radiation from the column. The object of the embodiment is a very economical construction with superior effectiveness.

In a second embodiment both the columns and the insulating panels are rotatable. The columns include separate insulated portions. Additional control of the insolation and radiation of the columns is thereby provided.

In a third embodiment the rotatable insulating panels are positioned in concave depressions formed in thermal storage columns. The columns include individual thermal convection means formed therein. In preferred form the columns are precast concrete or masonry which can serve as the load bearing south wall of the structure or as the roof of the structure.

In a fourth embodiment the rotatable panels are adapted to retrofit existing masonry walls for passive solar thermal storage.

Each of the embodiments disclosed includes modified forms of the basic construction. The first two embodiments may be sized for windows or for entire walls. The columns may be separated to allow the passage of light to the interior when desired by properly positioning the insulating panels. The constructions disclosed can be utilized for vertical walls, sloping walls and roofs and flat roofs. Structural support must be modified depending on the orientation, however, the basic modes and principles of operation are suitable for all orientations.

DESCRIPTION OF THE PREFERRED EMBODIMENTS

Figure 1:
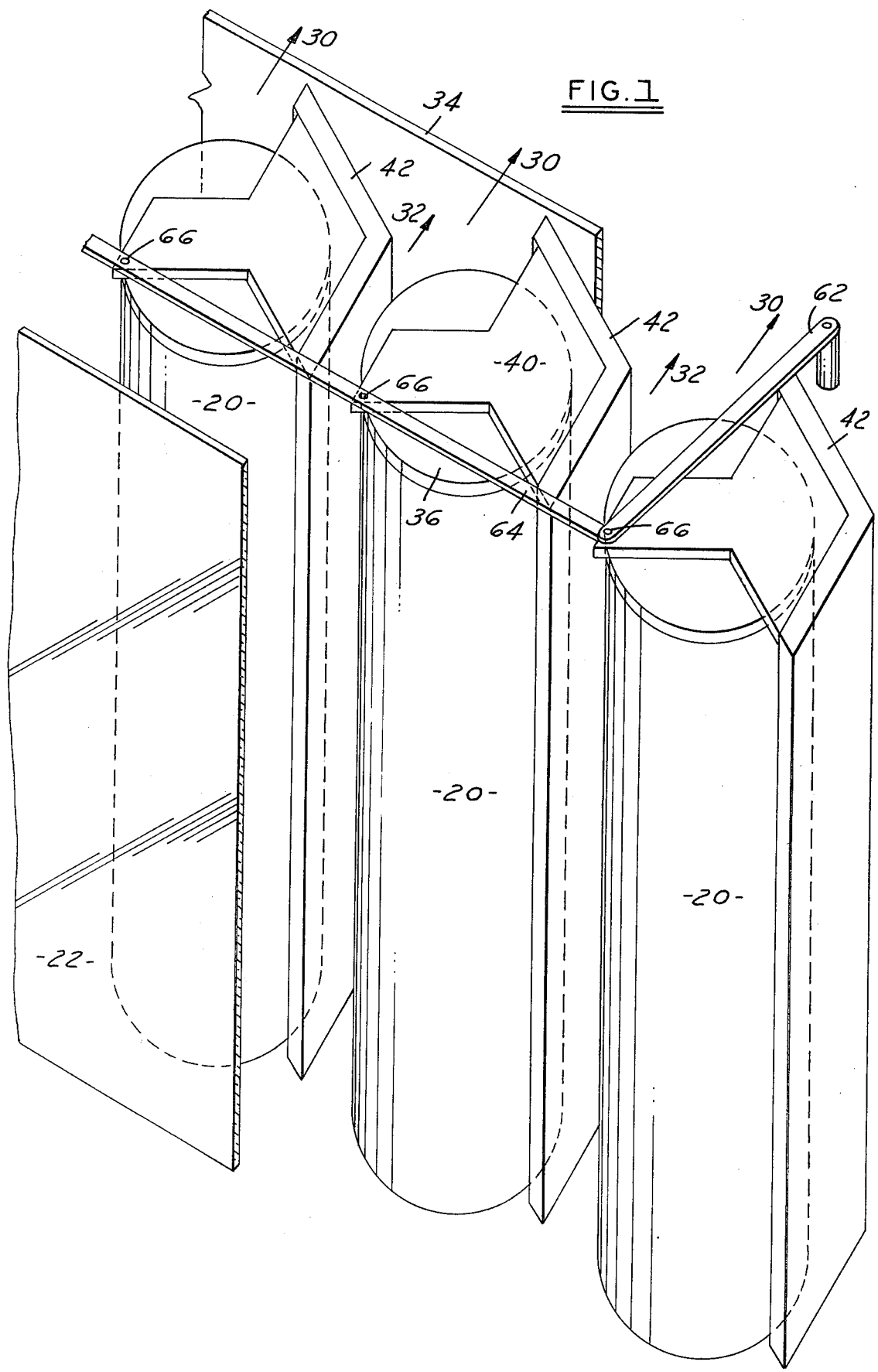
FIG. 1 is a broken out perspective view of the first thermal storage device.
Figure 2:
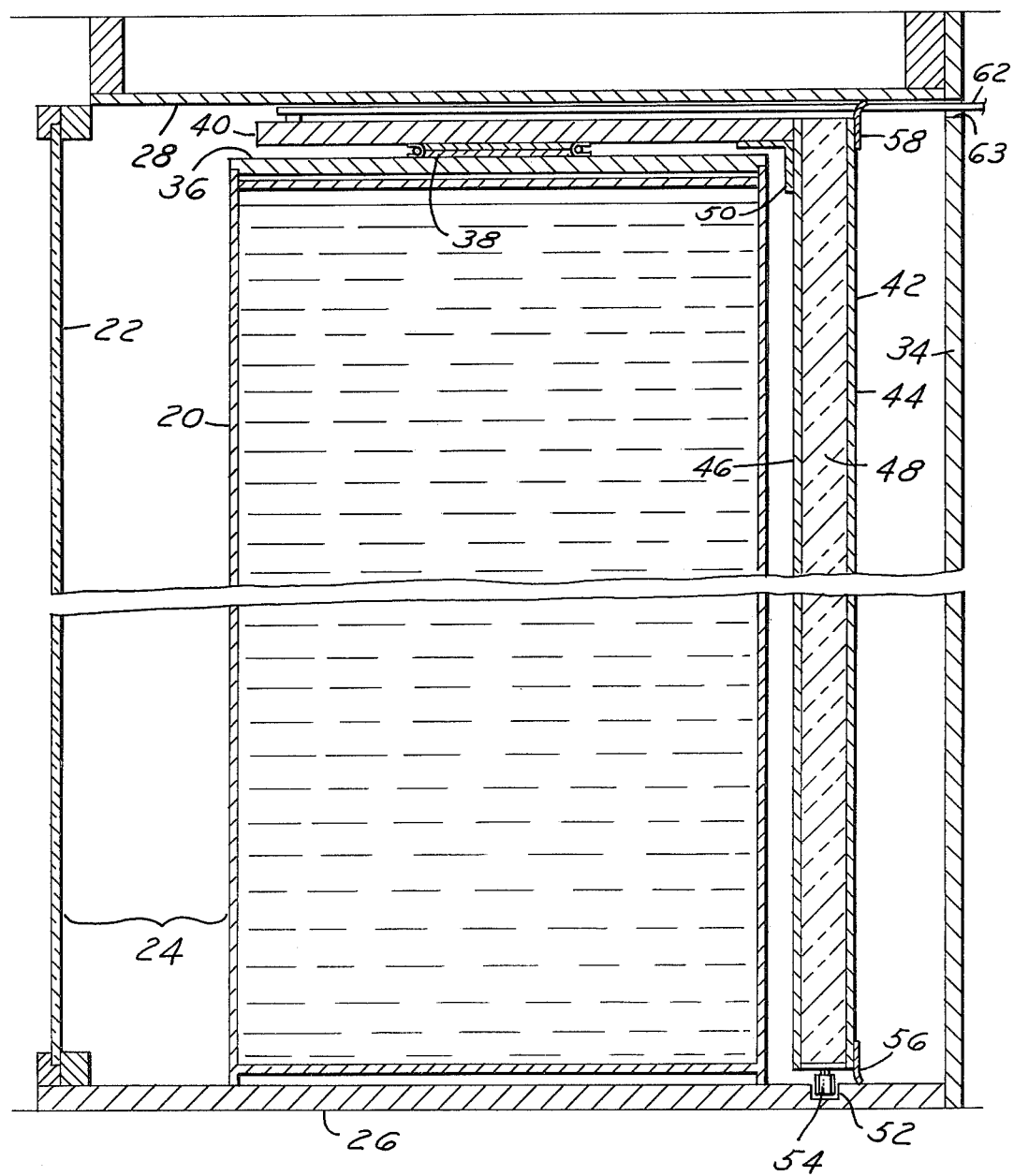
FIG. 2 is a vertical cross section of one column of the thermal storage device of FIG. 1.
Figure 3:
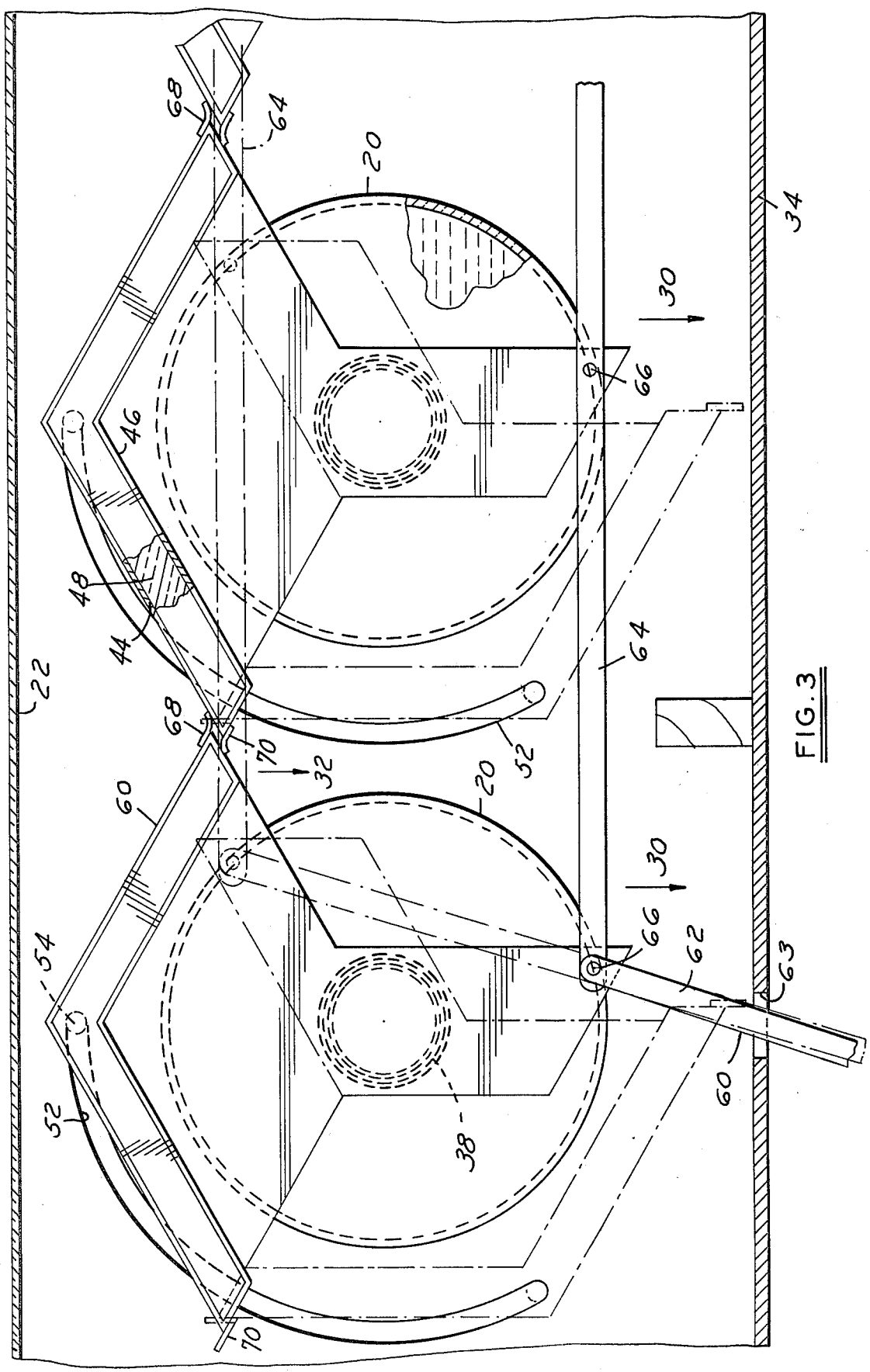
FIG. 3 is a top view of the thermal storage means of FIG. 1.

In FIGS. 1, 2 and 3 the solar thermal storage device comprises a plurality of stationary vertical water filled tanks or columns 20 preferably located in the south wall of a northern hemisphere structure. The tanks may alternatively be filled with a phase changeable thermal storage material, be cast concrete columns or any other suitable thermal storage material. The tanks are coated with a suitable material to maximize the absorbtion and radiation of heat. The tanks are located behind exterior glass or plastic glazing 22. Double or triple glazing may also be used. An air gap and clearance 24 is provided between the tanks 20 and glazing 22. The tanks rest upon the floor 26 of the structure and beneath a dropped ceiling 28.

In principle, the tanks of water 20 are heated by the daytime sunlight and heat penetrating the glazing 22 and striking the tanks. Heat radiated from the tanks toward the glazing is mostly in the infra red band and partially reflected back to the tanks 20. Heat, generally denoted by arrows 30, is also radiated from the tanks toward the structure interior. As denoted by arrows 32 light and heat may also pass directly through the clearance space between the tanks. Where the appearance of the tanks is objectionable or the direct light and heat is not desired, a wall of drywall, plaster or other interior facing material may be provided as shown at 34. The heat from the tanks 20 is absorbed by the wall 34 and re-radiated to the interior of the structure.

At the top of each tank a support plate 36 is fitted. Centered and fastened to the top plate is a bearing 38. A very economical and suitable bearing for this construction is the type commonly referred to as a "Lazy Susan" ball bearing. Resting upon and fastened to the bearing 38 is a cheek plate 40. The cheek plate 40 supports a shallow V-shaped sandwich insulating panel 42. The panel 42 has outer surfaces 44 and 46 of metal or other thin supportive and protective material and interior 48 of rigid insulation. The panel 42 is fastened by bonding or with any suitable mechanical fasteners to the cheek plate 40 as indicated by the angle brace 50.

An arcuate groove or track 52 is formed in the floor 26. Inserted in the track 52 is a roller follower 54 in turn fastened to the panel 42 bottom edge. The track 52 and follower 54 guide the panel as it is rotated about the tank 20. Fastened to the bottom and top of the panel 42 are sealig strips 56 and 58 in contact with the floor 26 and ceiling 28, respectively.

The position of the panels 42 as shown in FIG. 1 and ghosted in FIG. 3 provides for maximum daytime insolation. When the panels 42 are rotated to the position 60 shown in FIG. 3, the tanks 20 are prevented from radiating heat to the night sky. One of the cheek plates 40 includes a crank handle and arm 62 extending through a hold 63 in the wall 34. Pushing the crank arm toward the exterior of the structure opens the panels 42 to the daytime insolation position. Pulling the crank arm back toward the interior of the structure closes the panels 42 for nighttime insulation of the tanks. A synchronizing bar 64 connects together a plurality of cheek plates with pivots 66 such that all of the panels 42 move together when the crank arm 62 is pulled or pushed.

Any interference of the crank arm 62 with the sealing strip 58 is accomodated by the flexible nature of the strip. Additional sealing strips 68 and 70 are attached to the vertical edges of the panels 42 as shown in FIG. 3. Thus, when the panels are closed, air from the interior of the structure is prevented from circulating in contact with the glazing 22 but is free to circulate by natural convection adjacent the warm tanks 20. Where the optional interior wall 34 is utilized, vents (not shown) at the floor and ceiling can be provided to permit the circulation of air adjacent the tanks 20.

It has been found from test and experience that passive solar thermal walls can cause excessive temperature rise or temperature variations unless provision is made such as disclosed above to control the insolation of the tanks 20.

Of particular advantage is the ability to position the panels 42 in intermediate rotational locations between the extremes shown in FIG. 3. Thus, the amount of insolation absorbed by the tanks 20 can be controlled by partially closing the panels 42 in the daytime. Similarly, the panels 42 can be left partially open at night to permit more cooling during the night as desired.

The construction above lends itself to cooling as well as heating by closing the panels 42 in the daytime to prevent the summer sun from heating the tanks. The tanks then absorb heat from the interior during the daytime. Opening the panels at night permits the tanks to radiate the excess heat to the night sky. Thus, the device can function as a passive cooling means as well as heating means.

Figure 4:
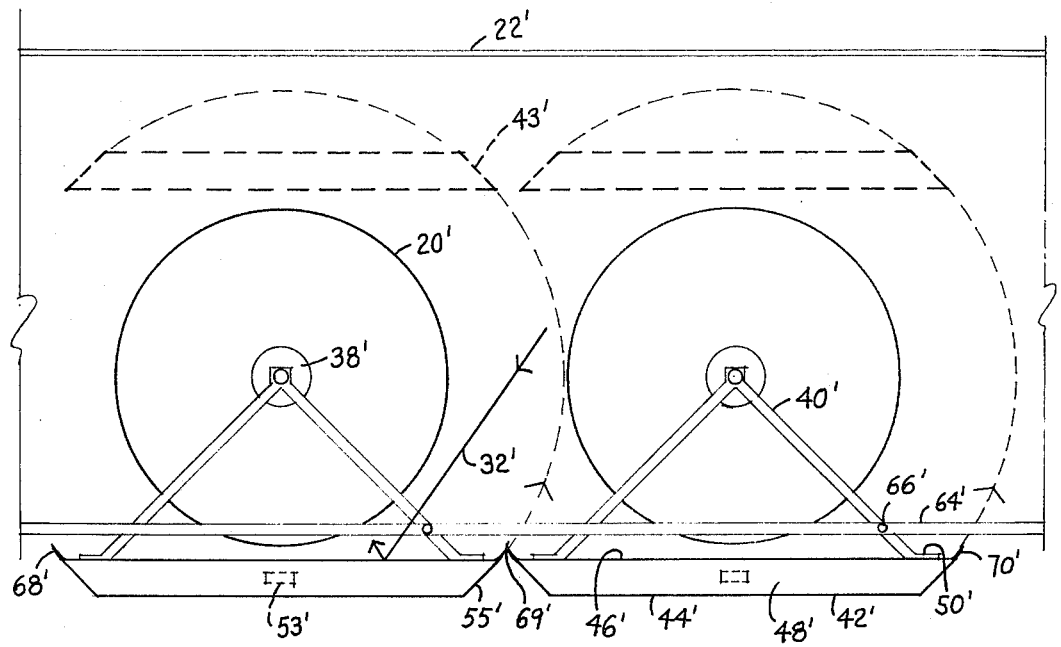
FIG. 4 is a top view of a modification of the thermal storage device of FIG. 1.
Figure 5:
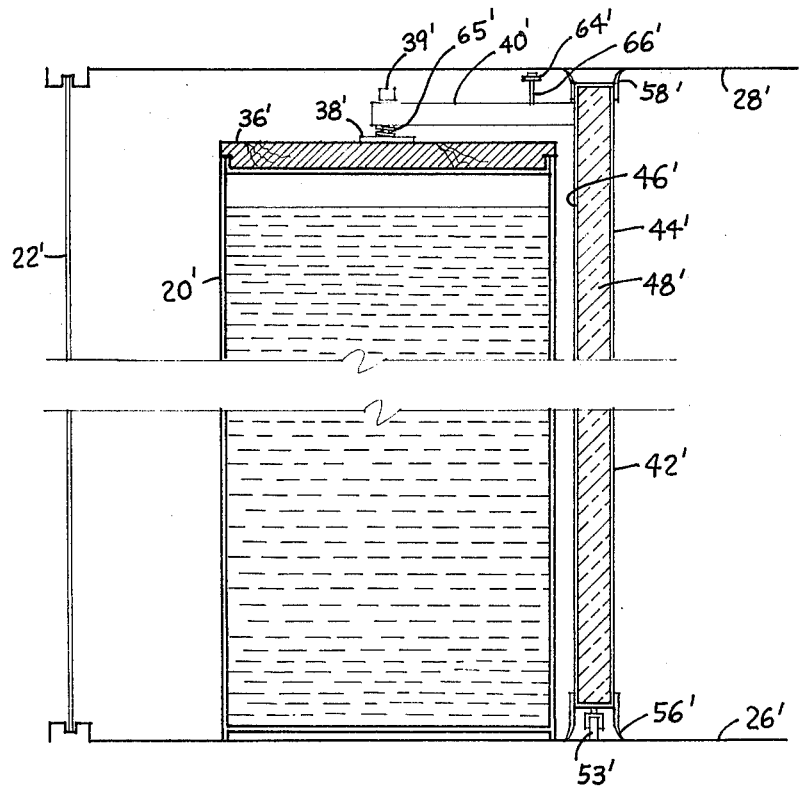
FIG. 5 is a vertical cross section of one column of the thermal storage device of FIG. 4.

In FIGS. 4 and 5 a modification of the solar thermal storage device comprises vertical water filled tanks or columns 20' located behind single or double glazing 22'. The tanks rest between the floor 26' and the ceiling 28' of the structure. A wood support plate 36' is fitted to the top of each tank 20'. Permanently attached above the center of the tank and support plate 36' is a vertical pivot 38' with a cap 39' to retain a cheek frame 40' to the pivot.

The cheek frame 40' is fastened permanently at 50' to a sandwich insulating panel 42'. The panel 42' includes metal outer surfaces 44' and 46' and an interior 48' of rigid insulation. Outer surfaces 44' and 46' may be finished with a reflective surface to provide further insulating value. The reflective surface of 46' provides the additional function of reflecting sunlight passing between the columns against the back of the columns as indicated by arrow 32'.

The panel 42' is also supported by caster 53' fastened to the panel bottom and in turn riding upon the floor 26'. Each panel 42' is chamfered at 55' to minimize the clearance between the columns 20' necessary when the panel is rotated to the night position 43'. The chamfered edges 55' are provided with flexible weatherstrip 68' and 70' to seal the panels when they are brought together as shown at 69'.

The panels are moved synchronously by movement of the unison bar 64'. The unison bar is attached to the cheek frame 40' by a vertical pivot 66' at a height sufficient to provide clearance above the central pivot 38' and cap 39' and through the flexible weatherstrip 58' at the panel 42' top. Manual movement of one of the panels 42' causes the other panels to follow suit from the daytime to nighttime positions shown or to any position selected in between. Flexible weatherstrip 56' is provided at the panel bottom also.

Where the unison bar 64' is actuated by automatic controls, motor or pneumatic cylinder means, biasing springs 65' may be inserted about the central pivots 38' to urge the panels toward the daytime or nighttime position and thereby to prevent bindup when the unison bar is directly above the central pivots 38'.

Figure 6:
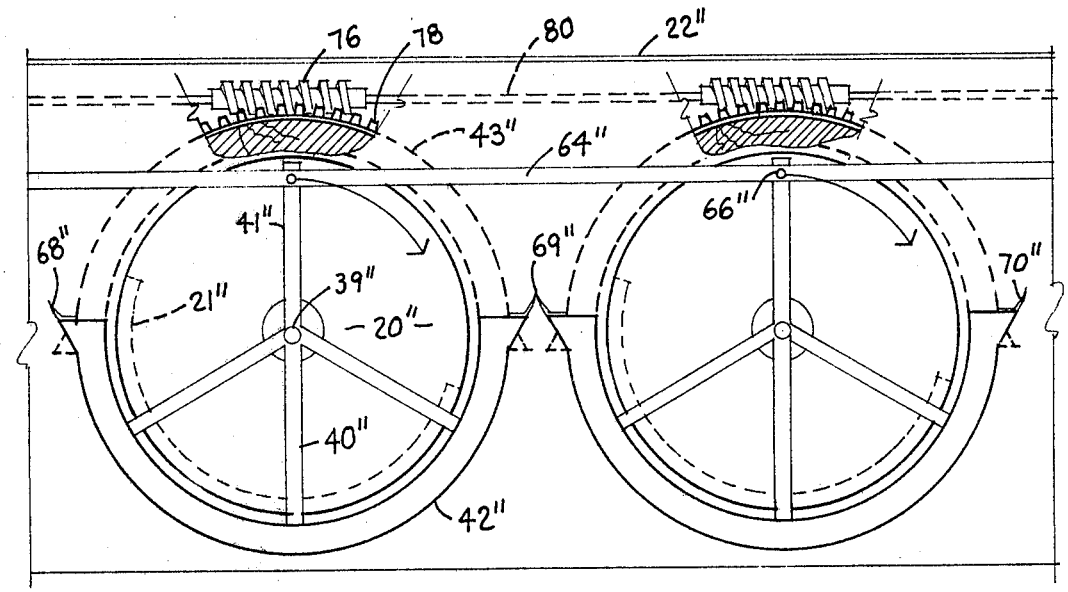
FIG. 6 is a top view of a double rotatable thermal storage device.
Figure 7:
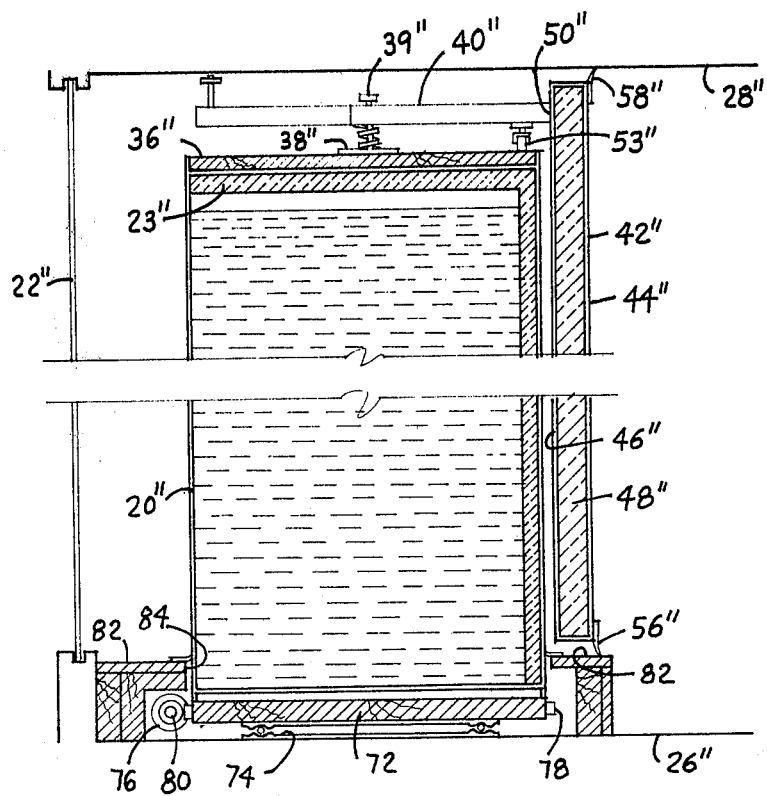
FIG. 7 is a vertical cross section of one column of the thermal storage device of FIG. 6.

In FIGS. 6 and 7 both column or tank 20" and a semicylindrical panel 42" are rotatable. The semicylindrical panel minimizes the clearance between tanks required. The vertical inside wall of the tank is partially insulated as shown at 21". Where the thermal storage medium is water or other liquid, the insulation material must be water proof or nonabsorbent of the thermal storage medium for maximum effectiveness. Where the thermal storage medium is a solid such as concrete, the insulation material may be formed and bonded into a depression in the exterior of the column.

The column 20" rests upon a wooden pad 72 in turn supported by a Lazy Susan type ball bearing 74 on the floor 26". The column 20" is rotated by worm gear 76 and ring gear 78 at the base of the column. The worm gear 76 is mounted on a shaft 80 that is parallel to the row of columns and rotated by a manual crank or an electric motor (not shown). The worm and gear may be constructed of metal castings. Little or no machining is required because the rotational speeds are very low. A particularly effective construction for the ring gear comprises a strip of sheet metal stamped to form gear teeth and wrapped and fastened fully or partially about the base of the column. As shown, multiple columns in a row can be rotated synchronously by the shaft 80. Enclosing the drive mechanism is a platform 82 constructed with apertures 84 for the columns 20".

At the top of the column 20" is a layer of insulation 23" to reduce heat radiation directly toward the ceiling 28". Above the insulation 23" is a wooden support plate 36" centered upon which is a vertical pivot 38" and cap 39" to retain a cheek frame 40" to the pivot. The cheek frame 40" is fastened to the panel 42" at 50" by any suitable permanent or semipermanent means such as adhesive or metal screws and bolts. Attached to the cheek frame 40" and riding upon the support plate 36" are caster 53". The casters 53" support the cheek frame 40" and panel 42" and permit the panel to be rotated about the column from the daytime winter position shown to the nighttime position indicated at 43". The panels 42" are again constructed of metal outer surfaces 44" and 46" and an interior rigid insulation 48". As shown the panels 42" include weatherstripping 56" and 58" engaging the platform 82 and ceiling 28" respectively. Where the panel side edges come together, weatherstripping 68" and 70" seals at 69" the gap between the panels in the winter daytime or nighttime 43" positions. The cheek frames 40" include extensions 41" pinned at 66" to a unison bar 64". Rotation of one of the panels 42" causes the other panels 42" to rotate in unison.

The double rotatable embodiment shown in FIGS. 6 and 7 permits more control of the heating and cooling of the thermal storage means and the interior of the structure. As an example, in early evening as the sun sinks too low to provide further heat, the interior of the structure very likely remains sufficiently warm. The panel 42" can be rotated to the nighttime position to prevent loss of heat to the outdoors while the column insulation 21" prevents additional heat radiation to the structure interior. As heat is needed inside the structure the column can be rotated as desired to expose the non-insulated portion to the structure interior.

The double rotatable embodiment permits more accurate adjustment and control of heat gain and loss in climates where the number of yearly solar insolation days is large but nighttime outdoor temperatures are low and the night sky unusually clear. The southwestern United States is a good example of this.

Figure 8:
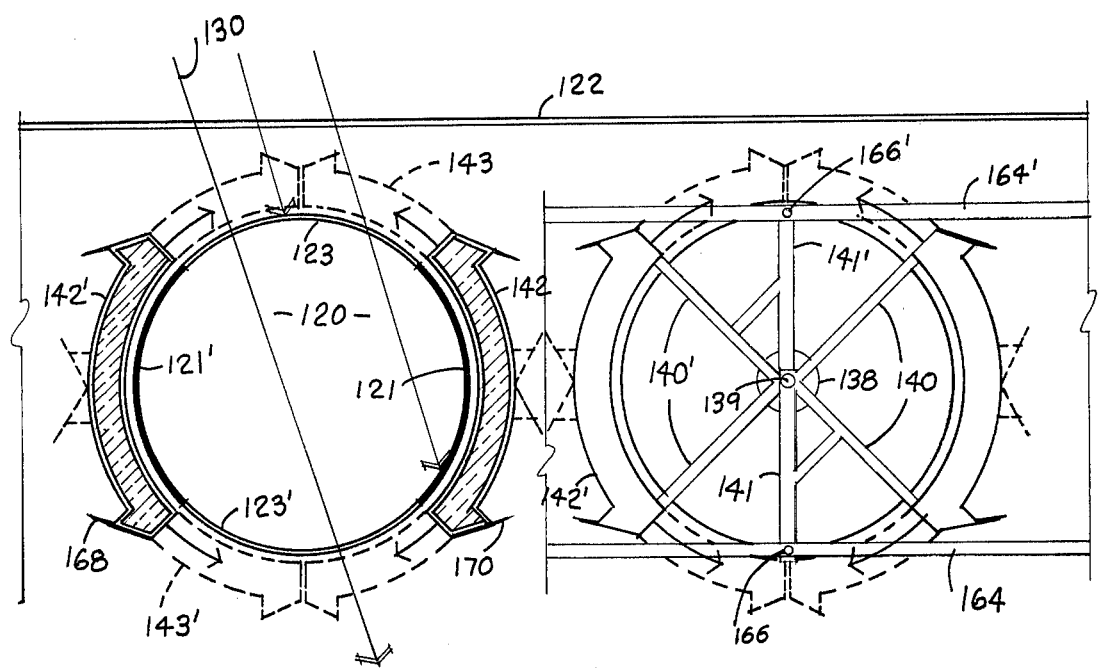
FIG. 8 is a top view of an opposed rotatable insulation thermal storage device.
Figure 9:
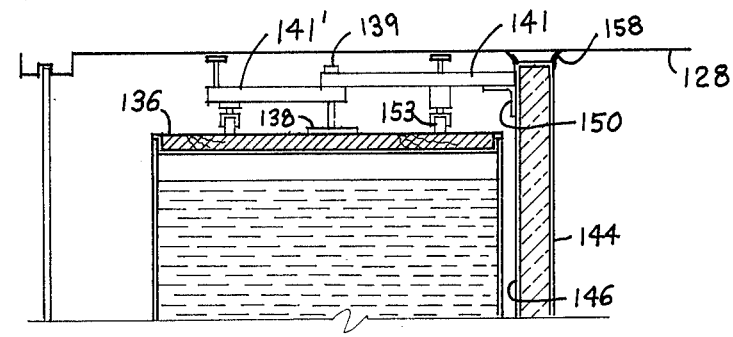
FIG. 9 is a vertical cross section of one column of the thermal storage device of FIG. 8.
Figure 9:
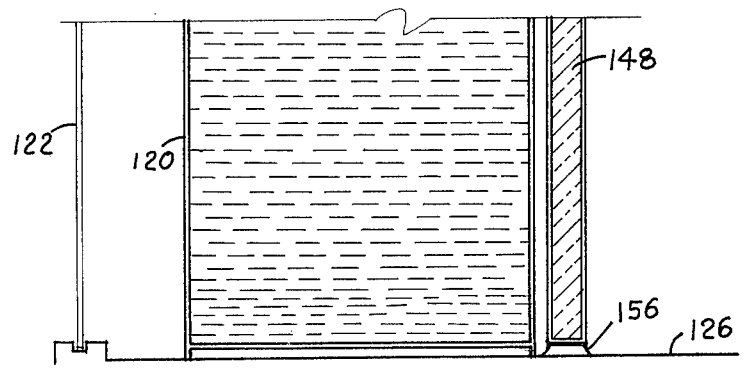

In the embodiments shown in FIGS. 8 and 9 the columns or tanks 120 are constructed of a transparent or translucent plastic or glass and filled with a translucent or transparent thermal storage medium such as water. Two opposed quartercylindrical portions 121 and 121' of the tank are coated on one or both sides with a heat and light absorbent material. The other opposed quartercylindrical portions 123 and 123' are transparent or translucent to permit daylight 130 to pass through the columns 120 when the dual opposed panels 142 and 142' are in the positions shown in FIG. 8. As above, the columns are positioned behind single or double glazing 122.

The columns 120 rest upon the floor 126 and are topped by wooden support plates 136. The left hand panels and column are shown cutaway and the right hand panels and column are shown from above in FIG. 8. A central pivot 138 is attached to each support plate 136 and includes a cap 139 to retain dual cheek frames 140 and 140' in turn attached to and supporting dual opposed quartercylindrical panels 142 and 142'. The cheek frames are fastened to the panels with supporting angle braces 150. Casters 153 are attached to the cheek frames and ride upon the support plate 136. The panels are weatherstripped 156 and 158 at the floor 126 and ceiling 128 respectively. The panels also include edge weatherstrip 168 and 170 that engage between the panels when the panels are in the full nighttime 143 or full daytime 143' winter positions. Hereagain the panels 142 and 142' can be constructed of two outer metal surfaces 144 and 146 with an interior of rigid insulation 148.

Each of the panels 142 and 142' has a corresponding unison bar 164 and 164' pinned at 166 and 166' to corresponding cheek frame extensions 141 and 141'. As shown movement of both unison bars to the right moves both panels to the winter night position and movement to the left moves both panels to the winter day position.

This embodiment permits additional daylight to enter the interior of the structure with the panels positioned as shown in FIG. 8. The columns 120 can be located very close together with the use of the quartercylindrical panels. The amount of light and heat entering the structure can be balanced against the heat being retained in the columns by adjusting the opening of the opposed panels. Thus, interior daylighting need not be sacrificed when maximizing the number of columns within a given length of south facing wall.

The embodiments of FIGS. 1 through 9 are described as floor to ceiling units, however, it will be apparent that the columns and operating mechanisms can be sized for use in windows or sized very large and tall for commercial buildings, office buildings and factories. Thus, while typical house units might be on the order of seven or eight feet in height, the window units may be about four feet tall and the commercial units on the order of twenty feet or more in height.

The embodiments of FIGS. 1 through 9 are not limited to vertical walls but may also be applied to sloping walls with the addition of added structural support for the columns or tanks at the top center pivots. For sloping or flat roofs the columns and tanks require structural support at both ends. The panels, however, can be mounted on rollers riding directly on the tanks to support the panels. Illustrative of ceiling or roof units is the embodiment shown in FIGS. 10 and 11.

Figure 10:
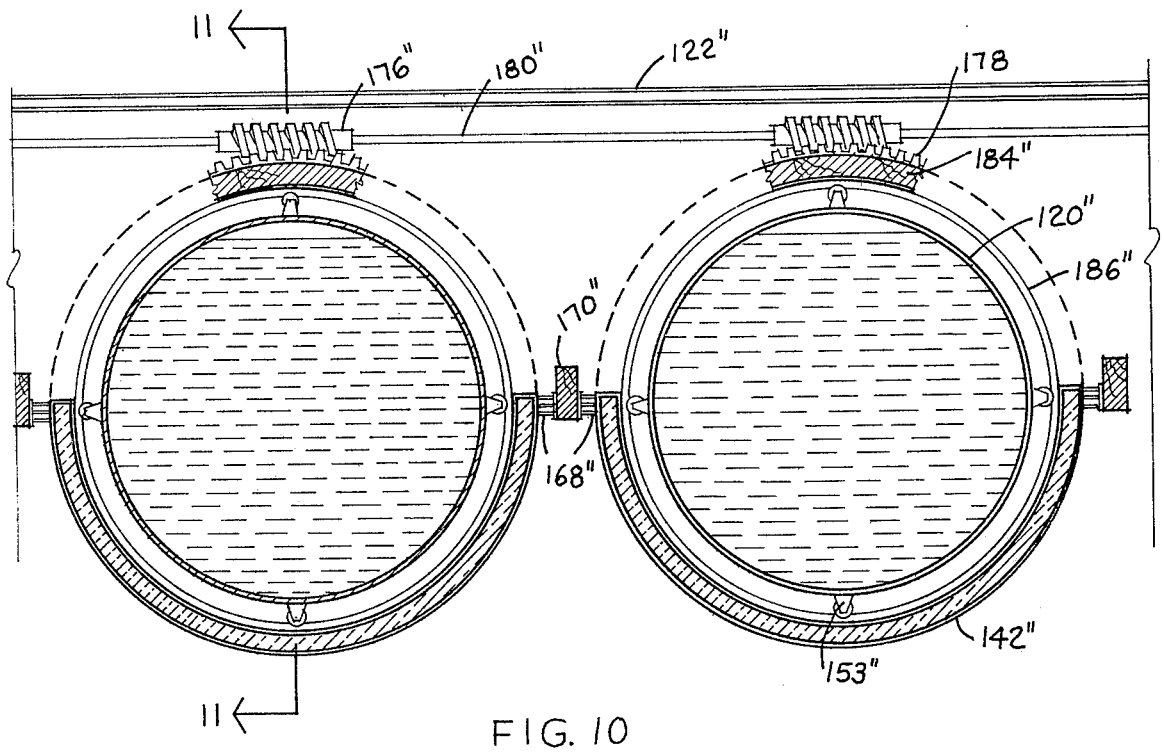
FIG. 10 is a cross section of horizontal thermal storage columns taken along the line 10—10 of FIG. 11.
Figure 11:
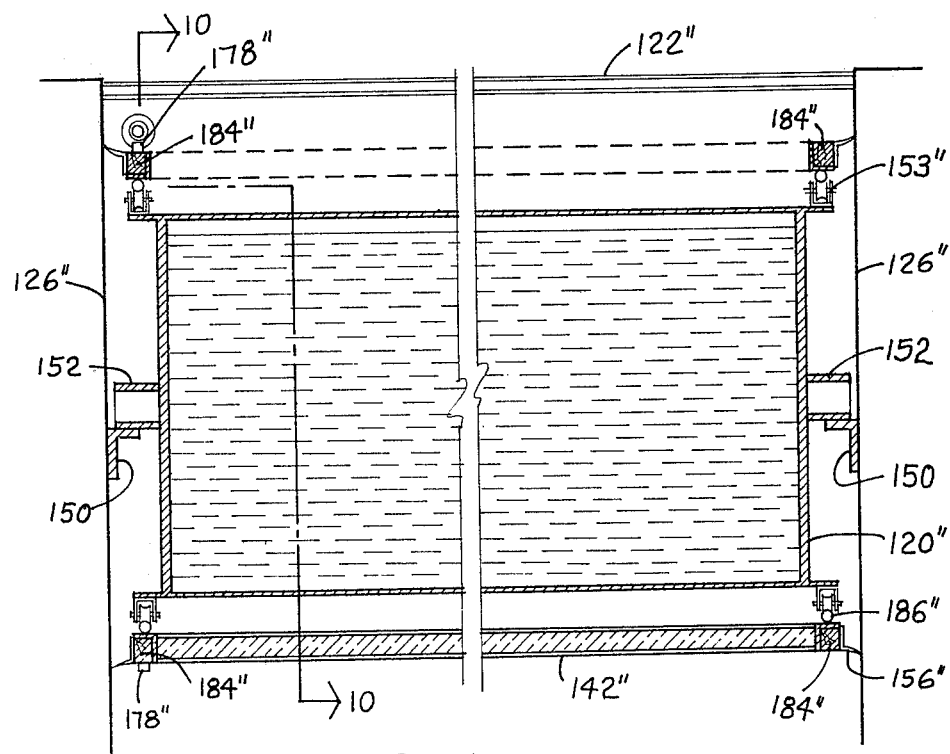
FIG. 11 is a longitudinal section of one of the horizontal thermal storage columns taken along the line 11—11 of FIG. 10.

In FIGS. 10 and 11 horizontal tanks or columns 120" containing water as a thermal storage medium are suspended from the building structure 126" or other structure by angle irons 150 and studs 152 extending from the tanks. Above the tanks 120" is glazing 122" forming the roof or skylight of the structure. Semicircular insulating panels 142" are rotatable about the tanks 120" and constructed with a rigid insulating core and reflective metal surfaces as above. At each end of the panel 142" a wooden ring 184" extends completely about the tank. At one end a ring gear 178" is fastened to the outer periphery of the wooden ring 184". The ring gear 178" engages a worm gear 176" mounted on a rotatable shaft 180" which extends from tank to tank for simultaneous movement of the panels 142" about a plurality of tanks.

The wooden rings 184" include a metal rod 186" fastened to the inner periphery thereof and which in turn engages a plurality of concave rollers 153" mounted about the tank periphery at each end. Thus by rotatably actuating the shaft 180" the panels 142" can be smoothly rotated about the tanks to any desired position with the panels fully supported in any position. Structural members 170" extend between the tanks longitudinally to support flexible seals 168" which in turn prevent the flow of interior air adjacent the glazing in this embodiment. Seals 156" are also provided about the wooden rings 184" to seal the gap between the tank ends and the joists.

Figure 12:
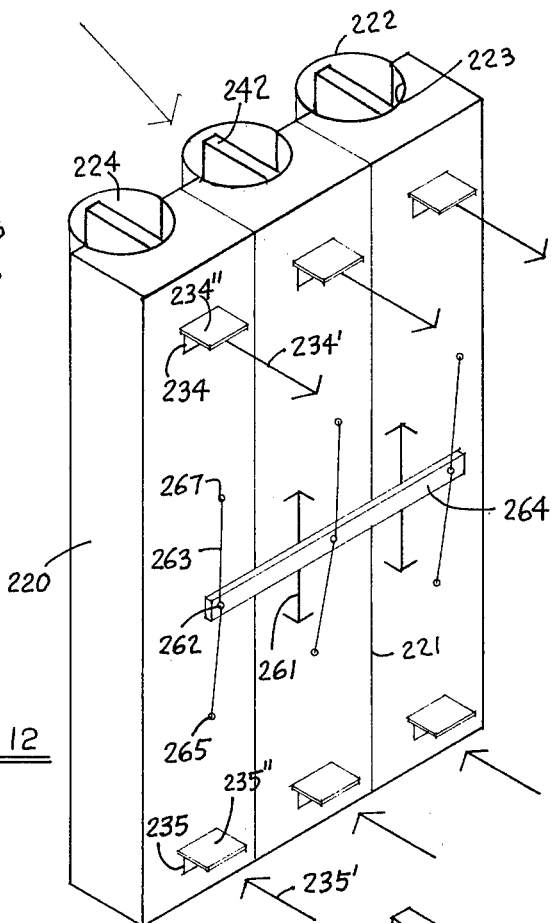
FIG. 12 is a perspective view of combined thermal storage and thermal convection columns.
Figure 13:
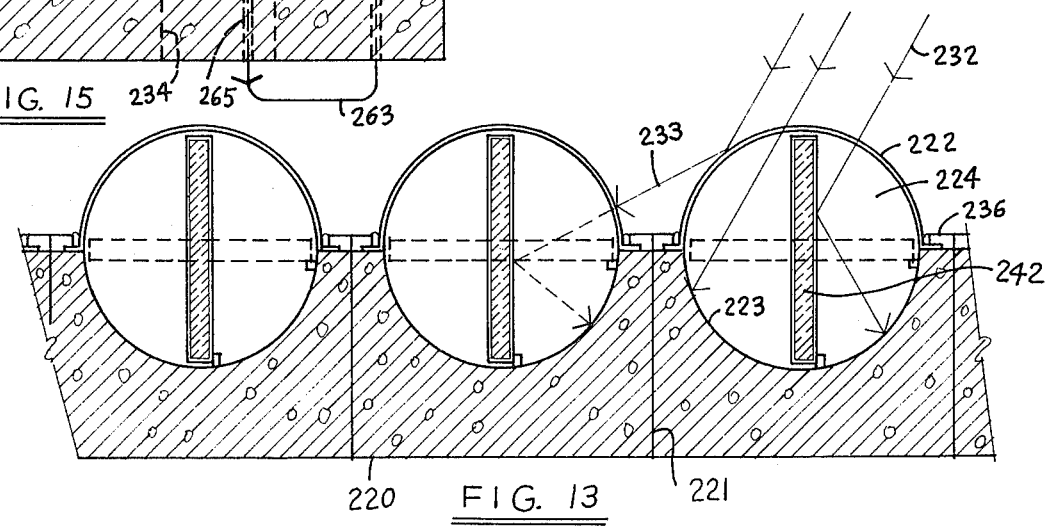
FIG. 13 is a cross section of the thermal storage columns of FIG. 12.

Modified embodiments for use on both walls and roofs are shown in FIGS. 12 through 24. The thermal storage columns disclosed in FIGS. 12 through 15 are particularly suitable for the south facing walls of a large commercial or factory structure although not limited thereto. In FIG. 12 the wall of a structure comprises a plurality of columns 220 preferably constructed of precast concrete or masonry. The joints 221 between the columns may be mortared or sealed with conventional sealants or weatherstripping. As best shown in FIG. 13 the columns 220 are formed with semicylindrical depressions 223 extending substantially the full length of each column on the outside thereof. Attached to the outside of each column is semicylindrical glazing 222 formed of glass or transparent plastic which encloses the depression to form a cylindrical chamber 224. Located within each chamber is a rotatable panel 242 supported by simple pivots (not shown) at the top and bottom of the panel. Thus, the panel 242 can be rotated from the position shown in FIG. 14 to the position shown in FIG. 15.

Figure 14:
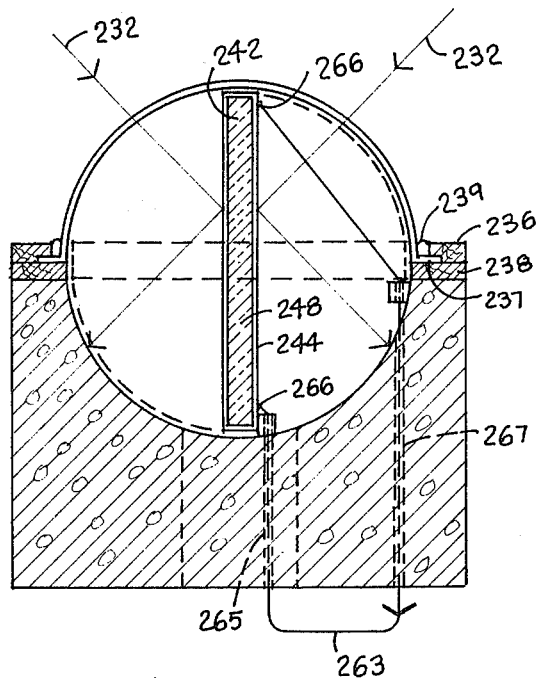
FIG. 14 is a cross section of a single column from the combined unit of FIG. 12 in insolation position.
Figure 15:
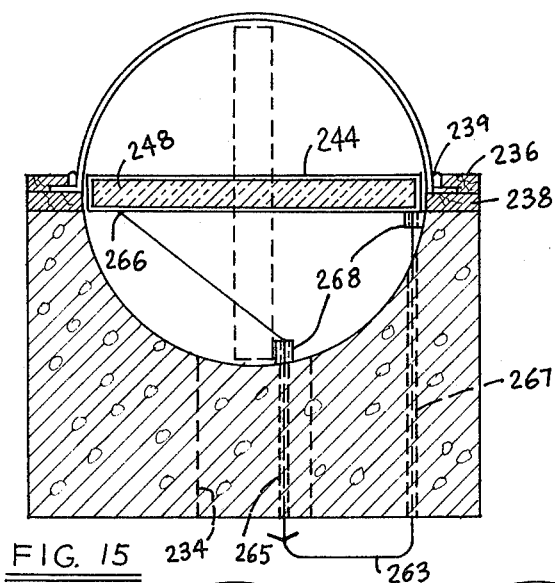
FIG. 15 is a cross section of a single column from the combined unit of FIG. 12 in insulation position.

The panels comprise an outer surface 244 of metal enclosing rigid insulating material 248 therewithin. Preferably the outer surface is finished with a highly reflective surface to provide further insulating value when closed as shown in FIG. 15 and when open to reflect sunlight to the depression 223 from either side as shown by the arrowed rays 232 in FIG. 14. Thus, as the sun moves from east to west throughout the day, the sunlight and heat gathered and absorbed by the column is maximized. The absorbtion of light and heat is further improved by the effect of adjacent columns as shown by the arrowed ray 233 in FIG. 13. Thus, light and heat striking the glazing of one column at such a low angle of incidence as to be reflected, is reflected at a high angle of incidence to the adjacent glazing. The semicylindrical depression 223 is preferably coated with a light and heat absorbent material.

As an option, the columns 220 may be formed with upper 234 and lower 235 vents communicating from the structure interior to the chamber 224. The vents permit the flow of air by convection through the chambers 224 as indicated by the arrows 234' and 235'. Such flow may be controlled by opening or closing the vent covers 234" and 235" as desired to increase the daytime or nighttime heating of the structure interior. In combination with the positioning of the panel 242 the heating of the structure interior in winter and cooling of the structure interior in summer can be more carefully adjusted.

Figures 12A, 12B:
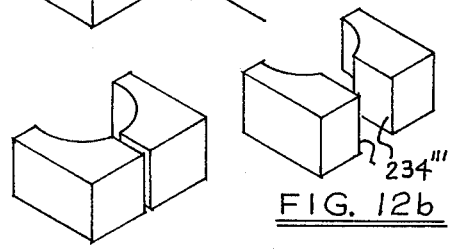
FIGS. 12a and 12b are perspective views of masonry elements for the columns of FIG. 12.

FIGS. 12a and 12b perspectively illustrate the shape of masonry blocks that may be used to construct the columns. The blocks of FIG. 12a are mortared together to form the vertical columns. The blocks of FIG. 12b are inserted as required to leave a gap 234" therebetween as shown for the vents 234 and 235.

The glazing 222 is fastened to the columns 220 by wooden molding strips 236 overlapping flanges 237 formed on the glazing. The wooden strips 236 may be bonded directly to the columns 220 as shown in FIG. 13 or fastened to back up strips 238 in turn fastened to the columns as shown in FIGS. 14 and 15. A molded sealing strip 239 to weatherproof the assembly is included as shown. Other conventional means of fastening and sealing glazing to a structural wall to form a supporting and weatherproof joint may be substituted.

The 90° movement of the panel 242 is actuated by a cable 263 extending through passages 265 and 267 formed in the column 220. The cable is attached to the panel adjacent the edges of the panel 242 as shown at 266. A unison bar 264 is attached to each column cable at 262. By movement parallel to the columns as indicated by arrows 261 the panels 242 are rotated. Stops 268 are attached to the depression 223 surface to prevent rotation of the panels 242 beyond the extreme day and night positions.

The columns 220 are ideally suited for use as the load bearing south facing wall of a commercial or factory structure. As precast concrete units they are also suited for structural use as sloping or flat roof. As a flat roof forced convection may be used to drive air through the optional vents 234 and 235 in substitution for the lack of adequate natural convection. Forced convection may be added as desired to boost the natural convection for columns in sloping or vertical walls.

Figure 16:
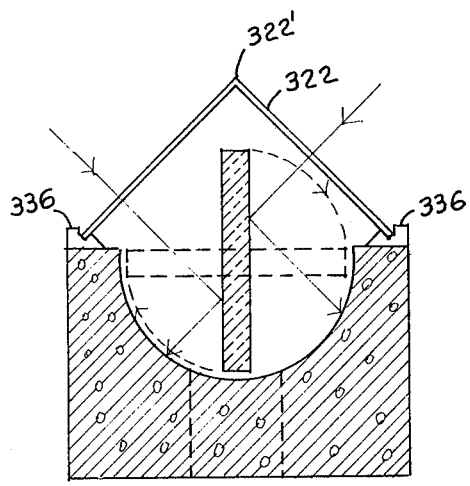
FIG. 16 is a cross section of a modification of the column of FIG. 14.
Figure 17:
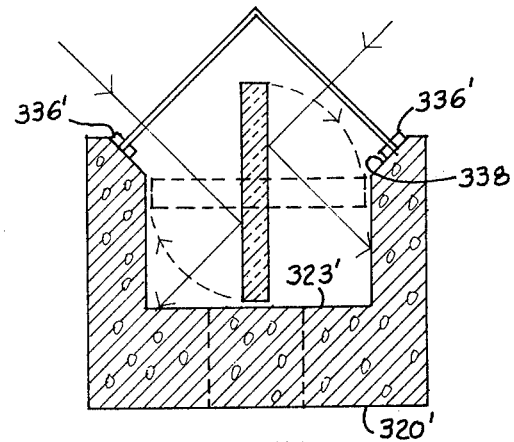
FIG. 17 is a cross section of a second modification of the column of FIG. 14.

FIGS. 16 and 17 illustrate optional configurations for the glazing of and depressions in the columns of FIGS.

12 through 15. Flat plate glazing 322 may be bonded together at 322' and structurally supported and sealed into extruded mullions 336 or 336' as shown in FIGS. 16 and 17. The column 320' of FIG. 17, however, includes chamfered faces 338 to which the mullions 336' are attached. The column 320' is formed with a rectangular depression 323'.

Figure 18:
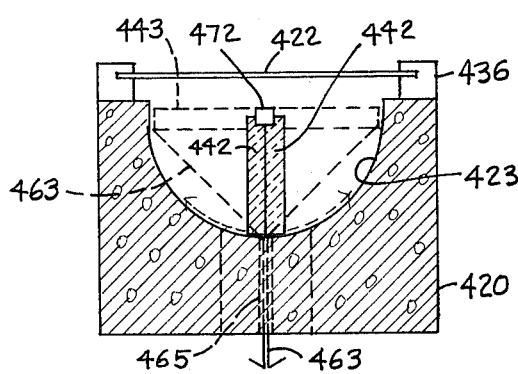
FIG. 18 is a cross section of a third modification of the column of FIG. 14.
Figure 19:
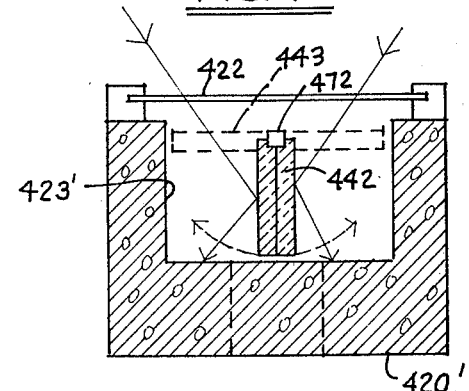
FIG. 19 is a cross section of a fourth modification of the column of FIG. 14.

Further optional configurations are disclosed in FIGS. 18 and 19. Single flat plate glazing 422 per column is illustrated for columns 420 and 420' having semi-cylindrical 423 and rectangular 423' depressions formed therein. The glazing is supported and sealed in mullions 436 in turn fastened to the columns. The insulating panels 442 are split and hinged at the center to a center supporting mullion 472 within the chamber 424. Preferably spring loaded hinges are utilized to mount the insulating panels 442 to the supporting mullions 472. The springs urge the panels to the winter nighttime position 443. Cables 463 through passages 465 can be actuated from inside the structure to open the panels to the winter daytime position as shown in solid outline.

Figure 20:
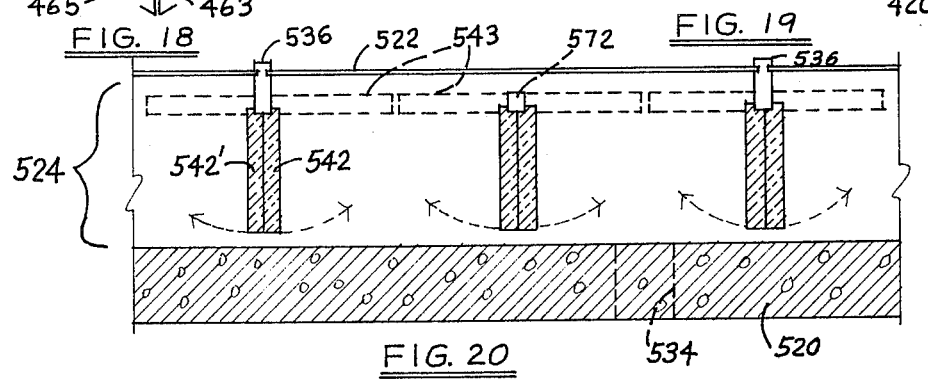
FIG. 20 is a cross section of a retrofit modification of the thermal storage columns of FIG. 12.
Figure 21:
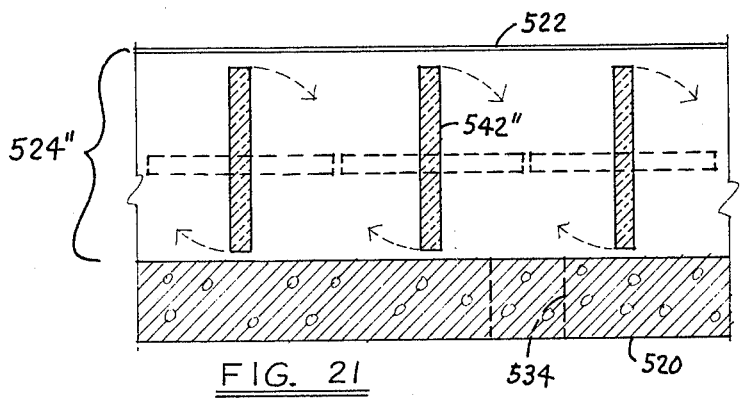
FIG. 21 is a cross section of a second retrofit modification of the thermal storage columns of FIG. 12.

FIGS. 20 and 21 illustrate the rotatable insulating panels above as applied to the retrofitting of existing masonry or concrete construction. In FIG. 20 glazing 522 is installed and supported on supporting mullions 536 periodically located along the existing wall or roof 520 and a suitable distance 524 therefrom to enclose split panels 542 and 542'. The split panels are hinged to the mullions 536 or interior mullions 572 for opposed 90° rotation from the daytime winter position shown in solid outline to the nighttime winter position 543. As above both surfaces of the panels are finished with a reflective surface to enhance the heat gathering during the daytime and insulating effectiveness during the nighttime. Vents 534 may be cut through the wall to provide natural convection as with the column above.

The panel hinges in FIG. 20 may be spring loaded to urge the panels to the closed nighttime position and the panels 542 and 542' actuated by cables passing through the wall as in FIGS. 18 and 19.

In FIG. 21 the panels 542'' are supported on pivots in the same manner as the panels of FIGS. 12 through 15. A simple mechanism such as the cables or unison bars above disclosed for rotating the panels 90° from the daytime to nighttime position can be used for the retrofit, however, the distance 524'' between the wall 520 and the glazing 522 is substantially greater than that required by the embodiment of FIG. 20.

Figure 22:
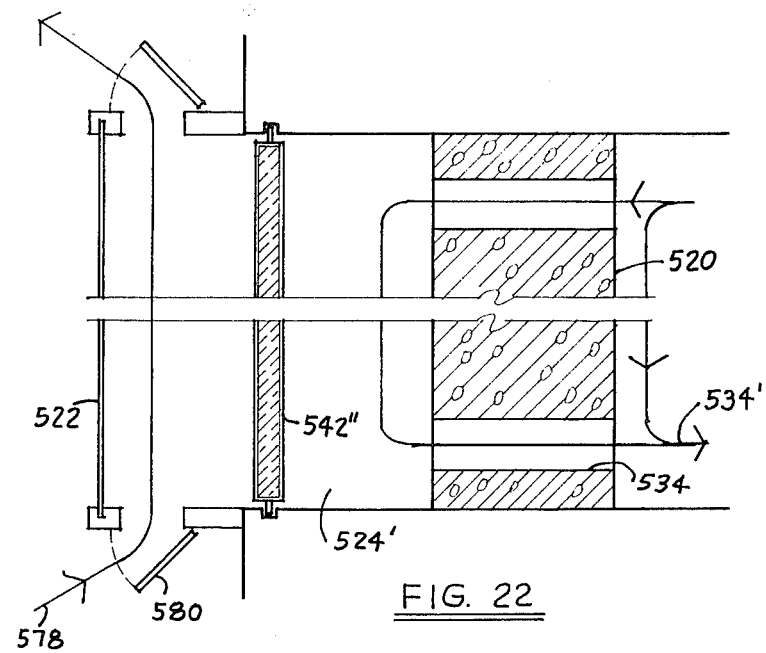
FIG. 22 is a cross section of a ventilation modification of the thermal storage devices of FIGS. 12 through 17 and 21.
Figure 23:
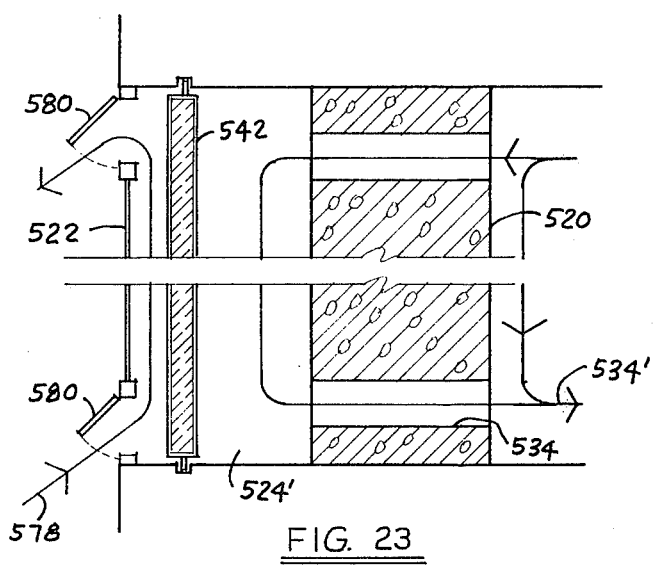
FIG. 23 is a cross section of a ventilation modification of the thermal storage devices in FIGS. 18, 19 and 20; and, FIG. 24 is a sectioned detail of a double hinged mullion for the panels of FIGS. 18, 19 and 20.

Modifications to the glazing in the various above embodiments are shown in FIGS. 22 and 23 to permit summer ventilation 578 of the space between the closed panels 542 or 542'' and the glazing 522. The vents 580 reduce the buildup of heated air in the space between the panels 542 or 542'' and thereby reduce the amount of insulation required in the panels to minimize transmission of heat to the space 524' adjacent the wall 520. The wall 520 is absorbing heat from the structure interior during the day by radiation and more importantly by convection as indicated by the arrows 534'.

At night the panels 542 and 542'' are opened and outside cool night air can circulate throughout the chamber space 524 between the wall 520 and the glazing 522. The vents 534 can be left open to allow cool night air to circulate to the interior or closed as desired. In the winter the vents 580 can be opened on hot sunny days to prevent excessive heat buildup in the chamber 524 or 524'' or to provide the addition of fresh air to the air circulation indicated by 534' but in a direction opposite that of the arrows.

Figure 24:
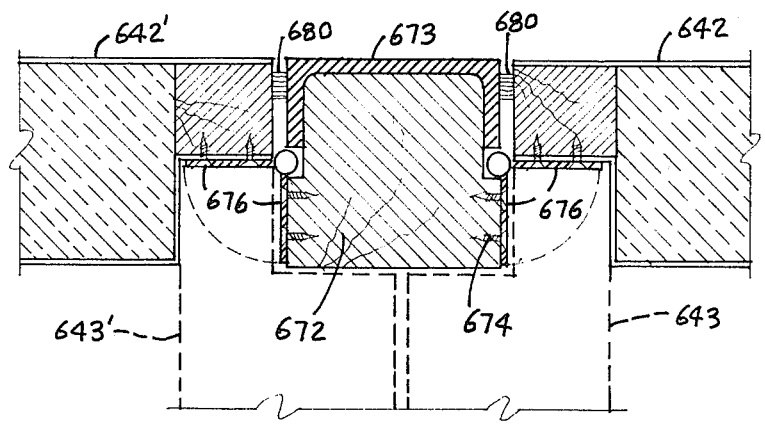

In FIG. 24 the mullions 472 and 572 of FIGS. 18 through 20 are shown in more detail. The mullions may be constructed of wood 672 with a reinforcing extruded aluminum cover 673. Attached by screws 674 are spring hinges 676 which are also attached by screws 678 to the split movable panels 642 and 642'. A flexible insulating strip 680 is attached to the mullion or panel to seal against air convection through the hinge point when the panels are closed as shown in solid outline in FIG. 24. The hinges 676 are biased by the springs to the position shown in solid outline and opened fully to the dotted outline 643 and 643' by actuating means as described above with reference to FIGS. 18 through 20.

I claim:

1. A passive solar thermal storage device comprising a thermal storage column, a concavity formed in the thermal storage column, glazing covering the concavity to form a chamber, substantially rigid insulating means positioned within the chamber and rotatable at least partially into the concavity in the thermal storage column to open and expose the concavity to insolation, said insulating means substantially covered on at least one side with a heat and light reflective surface, and means to rotatably actuate the reflective insulation means, said concavity in the thermal storage column exposable to both unreflected and reflected insolation with said insulating means fully opened.

2. The thermal storage device of claim 1 including at least two vents spaced apart with each vent being adapted to provide convective communication between the portion of the chamber enclosed by the concavity in the thermal storage column and by the insulation when closed and the interior of a structure.

3. The thermal storage device of claim 2 wherein at least two sides of said insulating means are substantially covered with a heat and light reflective surface and said concavity in the thermal storage column is substantially semi-cylindrical.

4. The thermal storage device of claim 1 wherein the glazing comprises at least one flat pane enclosing the concavity.

5. The thermal storage device of claim 1 including curved glazing to enclose a cylindrical chamber with said insulating means forming a diametral plane in said chamber.

6. The thermal storage device of claim 1 including at least on vent communicating from the portion of the chamber between the rotatable insulating means and the glazing, and the exterior environment.

7. A passive solar thermal storage device comprising a thermal storage column, substantially rigid insulating means at least partially covering the thermal storage column in the closed position, said insulating means rotatable relative to the thermal storage column, a heat and light reflective surface substantially covering at least one side of said insulating means, and at least one concavity formed in the thermal storage column, said reflective insulating means being rotatable at least partially into the concavity in the thermal storage column to open and expose the concavity to insolation and said concavity in the thermal storage column exposable to both unreflected and reflected insolation with said insulation means fully opened.

8. The thermal storage device of claim 7 including glazing covering the concavity to form a chamber, the insulating means being located within the chamber.

9. The thermal storage device of claim 8 including at least one vent with the chamber, said vent adapted to communicate with the interior of a structure and the portion of the chamber between the insulating means when closed and the thermal storage column.

10. The thermal storage device of claims 8 or 9 including means to rotate the insulating means, said means to rotate extending into the chamber.

11. The thermal storage device of claim 7 including means to rotate the insulating means.

12. The thermal storage device of claim 7 wherein at least two sides of said insulating means are substantially covered with a heat and light reflective surface and said concavity in the thermal storage column is substantially semi-cylindrical.

13. The thermal storage device of claim 7 including a second insulating means rotatable in said concavity.

14. The thermal storage device of claim 13 wherein said first and second insulating means are fastened to a support and rotatably movable apart and together within the concavity.

15. The thermal storage device of claim 14 including means urging the first and second insulating means apart.

16. The thermal storage device of claim 15 including actuating means adapted to bring the first and second insulating means together.

17. The thermal storage device of claims 7 or 1 wherein said insulating means are substantially oblong in cross section, an oblong side being spaced from the surface of said concavity in the closed position to form an enclosed insulative air chamber with said surface.

18. The thermal storage device of claims 7 or 1 wherein said insulating means are substantially oblong in cross section, an oblong side being spaced from the surface of said concavity in both the closed and open positions of the insulating means.

* * * * *